(12) United States Patent
Oya

(10) Patent No.: US 10,099,573 B2
(45) Date of Patent: Oct. 16, 2018

(54) DRIVE SYSTEM AND VEHICLE

(71) Applicant: TOYOTA JIDOSHA KABUSHIKI KAISHA, Toyota-shi, Aichi-ken (JP)

(72) Inventor: Ryosuke Oya, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/819,558

(22) Filed: Nov. 21, 2017

(65) Prior Publication Data
US 2018/0162233 A1 Jun. 14, 2018

(30) Foreign Application Priority Data
Dec. 12, 2016 (JP) .................. 2016-240151

(51) Int. Cl.
H02P 1/46 (2006.01)
H02P 1/50 (2006.01)
H02P 3/18 (2006.01)
H02P 6/00 (2016.01)
B60L 11/18 (2006.01)
H01M 8/04537 (2016.01)
H01M 8/04858 (2016.01)
(Continued)

(52) U.S. Cl.
CPC ....... B60L 11/1887 (2013.01); B60L 11/1803 (2013.01); B60L 11/1883 (2013.01); H01M 2/34 (2013.01); H01M 8/04552 (2013.01); H01M 8/04567 (2013.01); H01M 8/04873 (2013.01); H01M 8/04917 (2013.01); H01M 8/04947 (2013.01); H01M 10/425 (2013.01); H01M 10/48 (2013.01); H01M 16/006 (2013.01); H02P 5/74 (2013.01); H01M 2200/00 (2013.01); H01M 2220/20 (2013.01); H01M 2250/20 (2013.01); H01M 2250/402 (2013.01)

(58) Field of Classification Search
CPC .................. B60L 11/1887; B60L 11/1803
USPC .......................................... 318/722
See application file for complete search history.

(56) References Cited

U.S. PATENT DOCUMENTS

| | | | |
|---|---|---|---|
| 2012/0020124 A1* | 1/2012 | Minamii | H02H 7/1225 363/53 |
| 2012/0053766 A1* | 3/2012 | Ham | B60L 3/0053 701/22 |
| 2016/0156084 A1* | 6/2016 | Kim | H01M 16/006 429/9 |

FOREIGN PATENT DOCUMENTS

| | | |
|---|---|---|
| JP | 2010-3444 | 1/2010 |
| JP | 2014-183705 | 9/2014 |

\* cited by examiner

*Primary Examiner* — Erick Glass
(74) *Attorney, Agent, or Firm* — Finnegan, Henderson, Farabow, Garrett & Dunner, LLP

(57) ABSTRACT

A drive system includes a drive device including an electric power generator; a fuel cell; a secondary battery; a fuel cell step-up converter including a diode; a relay connected to wiring between the fuel cell step-up converter and the drive device; a secondary battery step-up converter connected; a fuel cell voltage sensor; a secondary battery voltage sensor; and a controller. The controller stops the secondary battery step-up converter when a short-circuit fault of the diode is detected, disconnects the relay when a voltage of the fuel cell is higher than a voltage of the secondary battery after stopping the secondary battery step-up converter, and when the voltage of the secondary battery is higher than or equal to the voltage of the fuel cell, executes a voltage control process which increases the voltage of the fuel cell relative (Continued)

to the voltage of the secondary battery, and disconnects the relay.

9 Claims, 3 Drawing Sheets

(51) Int. Cl.
*H01M 10/42* (2006.01)
*H01M 10/48* (2006.01)
*H01M 2/34* (2006.01)
*H01M 8/04828* (2016.01)
*H02P 5/74* (2006.01)
*H01M 16/00* (2006.01)

DRIVE SYSTEM AND VEHICLE

INCORPORATION BY REFERENCE

The disclosure of Japanese Patent Application No. 2016-240151 filed on Dec. 12, 2016 including the specification, drawings and abstract is incorporated herein by reference in its entirety.

BACKGROUND

1. Technical Field

The present disclosure relates to a drive system and a vehicle.

2. Description of Related Art

A drive system in the related art includes a fuel cell, a fuel cell step-up converter, a battery, and a battery step-up converter, as disclosed in, for example, Japanese Unexamined Patent Application Publication No. 2014-183705 (JP 2014-183705 A). The drive system drives a drive motor by power stepped up by the fuel cell step-up converter and power stepped up by the battery step-up converter. The fuel cell step-up converter includes a reverse current protection diode in order to prevent a reverse flow of a current to the fuel cell. When the reverse current protection diode has a short-circuit fault, the drive system disclosed in JP 2014-183705 A prevents a reverse flow of a current to the fuel cell at the time of the failure by disconnecting a relay that is connected in series to the reverse current protection diode.

SUMMARY

When the relay in the drive system disclosed in JP 2014-183705 A has a small size, the disconnection of the relay is performed in a state where a current flows, and a contact of the relay is more likely to be melted. Thus, it is desirable to provide a technology that prevents melting of a contact of a relay when the relay is disconnected due to a short-circuit fault of a reverse current protection diode in a drive system.

A first aspect relates to a drive system. The drive system includes a drive device including an electric power generator; a fuel cell; a secondary battery; a fuel cell step-up converter connected between the fuel cell and the drive device, the fuel cell step-up converter including a diode configured to prevent a flow of a current to the fuel cell; a relay connected to a wiring between the fuel cell step-up converter and the drive device; a secondary battery step-up converter connected between the secondary battery and a part of the wiring between the drive device and the relay; a fuel cell voltage sensor configured to measure a voltage of the fuel cell; a secondary battery voltage sensor configured to measure a voltage of the secondary battery; and a controller. The controller is configured to, when a short-circuit fault of the diode is detected, stop the secondary battery step-up converter; disconnect the relay when the measured voltage of the fuel cell is higher than the measured voltage of the secondary battery after stopping the secondary battery step-up converter; and when the measured voltage of the secondary battery is higher than or equal to the measured voltage of the fuel cell after stopping the secondary battery step-up converter, execute a voltage control process which increases the voltage of the fuel cell relative to the voltage of the secondary battery, and disconnect the relay.

When the voltage of the fuel cell is higher than the voltage of the secondary battery at the time of detection of a short-circuit fault of the diode included in the fuel cell step-up converter, the first aspect has a relatively low possibility of a reverse flow of a current to the fuel cell from the secondary battery step-up converter side through the fuel cell step-up converter. In addition, since the voltage of the fuel cell is increased relative to the voltage of the secondary battery when the voltage of the secondary battery is higher than or equal to the voltage of the fuel cell, the possibility of a reverse flow of a current to the fuel cell can be decreased. Thus, the drive system of the aspect can prevent melting of a contact of the relay when the relay is disconnected due to a short-circuit fault of the diode.

In the drive system according to the first aspect, the voltage control process may be a control process that increases the voltage of the fuel cell relative to the voltage of the secondary battery by increasing an amount of reactant gas supplied to the fuel cell. The first aspect can easily perform the voltage control process that increases the voltage of the fuel cell relative to the voltage of the secondary battery. Thus, melting of the relay is easily prevented.

In the drive system according to the first aspect, the controller may stop the electric power generator before disconnecting the relay when the measured voltage of the fuel cell is higher than the measured voltage of the secondary battery. The first aspect can realize non-arc discharge.

In the drive system according to the first aspect, the controller may stop the electric power generator and disconnect the relay when the measured voltage of the fuel cell is higher than the measured voltage of the secondary battery after executing the voltage control process, and when a state in which the measured voltage of the secondary battery is higher than or equal to the measured voltage of the fuel cell continues for a period of time determined in advance after executing the voltage control process, may disconnect the relay without stopping the electric power generator. The first aspect appropriately controls driving or stopping of the electric power generator from the second comparison between the voltage of the fuel cell and the voltage of the secondary battery and thus, can securely prevent melting of the relay.

The drive system according to the first aspect may further include an electric device configured to receive power supplied from the secondary battery, and the voltage control process may be a control process that increases power consumption by the electric device. The first aspect can easily perform the voltage control process that increases the voltage of the fuel cell relative to the voltage of the secondary battery. Thus, melting of the relay is easily prevented.

In the drive system according to the first aspect, the controller may stop the electric power generator before disconnecting the relay when the measured voltage of the fuel cell is higher than the measured voltage of the secondary battery. The first aspect can realize non-arc discharge.

In the first aspect, when the measured voltage of the fuel cell is higher than the measured voltage of the secondary battery after executing the voltage control process, the controller may stop the electric power generator and disconnect the relay while the electric device remains in operation.

In the drive system according to the first aspect, when a state in which the measured voltage of the secondary battery is higher than or equal to the measured voltage of the fuel cell continues for a period of time determined in advance after executing the voltage control process, the controller may disconnect the relay without stopping the electric power generator while the electric device remains in operation. The first aspect appropriately controls operating or stopping of the electric power generator and operating of the electric device from the second comparison between the voltage of the fuel cell and the voltage of the secondary battery and thus, can securely prevent melting of the relay.

A second aspect relates to a vehicle including the drive system according to the first aspect. The second aspect can prevent melting of the contact of the relay when the relay is disconnected due to a short-circuit fault of the diode included in the drive system.

The aspects can be realized in various forms other than the device (system) and the vehicle. For example, the aspects can be realized in forms including a moving object, other than the vehicle, such as a ship or an airplane in which the drive system is mounted, a control method for the drive system, a computer program that realizes the control method, a transient recording medium in which the computer program is recorded, and the like.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

A. First Embodiment

A-1. Configuration of Drive System

Figure 1:
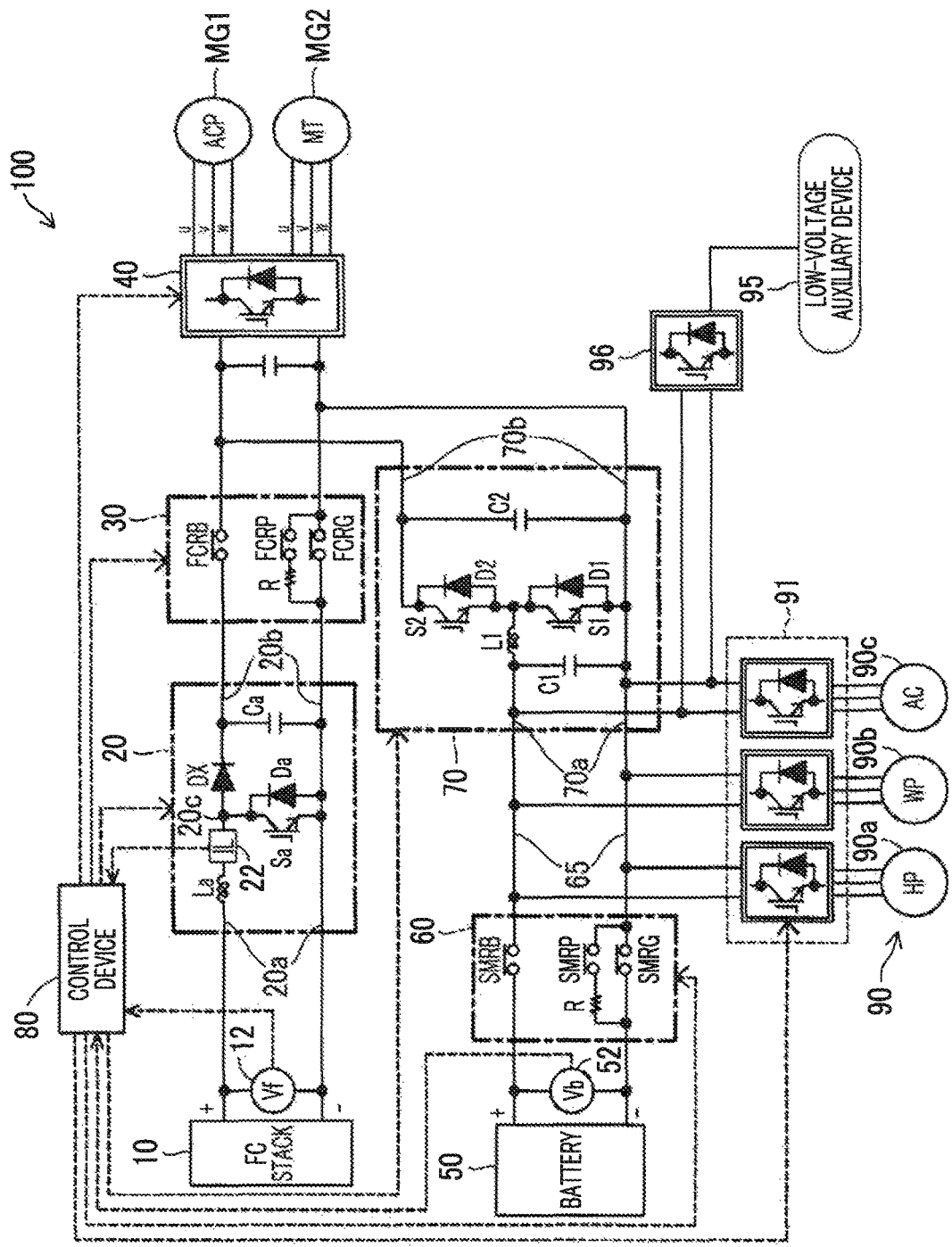
FIG. 1 is a descriptive diagram illustrating an electrical system of a drive system in a first embodiment.

FIG. 1 is a descriptive diagram illustrating an electrical system of a drive system 100 in a first embodiment. The drive system 100 is mounted in, for example, a vehicle. The drive system 100 includes a fuel cell stack (FC stack) 10, a fuel cell step-up converter 20, a fuel cell relay circuit 30, an inverter 40, an air compressor MG1, a drive motor MG2, a battery 50, a battery relay circuit 60, a battery step-up converter 70, and a control device 80.

The fuel cell stack 10 is a unit that generates power by an electrochemical reaction between hydrogen gas and oxidizing gas, and is formed by stacking a plurality of single cells. Each single cell is a power generating element that can generate power alone, and includes a membrane electrode assembly that is a power generating body configured by disposing electrodes (a cathode and an anode) on both surfaces of an electrolyte membrane, and a separator that is disposed on both outer sides of the membrane electrode assembly. The fuel cell stack 10 corresponds to a "fuel cell" in a first aspect disclosed in "SUMMARY".

The battery 50 is configured with, for example, a lithium ion cell or a nickel-hydrogen cell. The battery 50 corresponds to a "secondary battery" in the first aspect disclosed in "SUMMARY".

The air compressor MG1 is disposed in an oxidizing gas system that supplies oxidizing gas to the fuel cell stack 10. The air compressor MG1 supplies air as the oxidizing gas to the fuel cell stack 10. The air compressor MG1 includes a synchronous motor that includes a three-phase coil. The synchronous motor is an electric power generator that can be operated in reverse as an electric motor and a power generator.

The drive motor MG2 is an electric motor that converts three-phase alternating current power into rotational motive power, and drives wheels (not illustrated) of the vehicle in which the drive system 100 is mounted. The drive motor MG2 is an electric power generator that can be operated in reverse as an electric motor and a power generator.

The inverter 40 converts direct current power supplied from the battery 50 side or the fuel cell stack 10 side into three-phase alternating current power and supplies the three-phase alternating current power to the drive motor MG2 and the synchronous motor of the air compressor MG1. The drive motor MG2, the air compressor MG1, and the inverter 40 correspond to a "drive device" in the first aspect disclosed in "SUMMARY".

The fuel cell stack 10 is connected to primary side wiring 20a of the fuel cell step-up converter 20. The inverter 40 is connected to secondary side wiring 20b of the fuel cell step-Up converter 20 through the fuel cell relay circuit 30. In the present specification, the "primary side" refers to a side to which power is supplied, that is, an input side. The "secondary side" refers to a side from which power is supplied, that is, an output side.

The fuel cell step-up converter 20 is a step-up converter that steps up the power of the fuel cell stack 10 and supplies the stepped-up power to the inverter 40. The fuel cell step-up converter 20 includes a coil (referred to as a "reactor") La, a switching element Sa, a diode Da, a reverse current protection diode DX, and a capacitor Ca. Specifically, a first end of the reactor La is connected to a positive electrode side of the fuel cell stack 10. An anode terminal of the reverse current protection diode DX is connected to a second end side of the reactor La. The switching element Sa is connected between a negative electrode side of the fuel cell stack 10 and a point 20c between the reactor La and the reverse current protection diode DX. The diode Da is connected in parallel to the switching element Sa. The capacitor Ca is connected between a cathode terminal side of the reverse current protection diode DX and the negative electrode side of the fuel cell stack 10. The reverse current protection diode DX prevents a flow of a current (reverse flow) from the secondary side wiring 20b side to the primary side wiring 20a side of the fuel cell step-up converter 20. The reverse current protection diode DX corresponds to a "diode" in the first aspect disclosed in "SUMMARY".

The fuel cell relay circuit 30 is interposed between the secondary side wiring 20b of the fuel cell step-up converter 20 and the inverter 40 and switches electrical connection and disconnection between the fuel cell step-up converter 20 and the inverter 40. The fuel cell relay circuit 30 has a first fuel cell main relay FCRB, a second fuel cell main relay FCRG, a fuel cell pre-charge relay FCRP that is connected in parallel with the second fuel cell main relay FCRG, and a limiting resistor R that is connected in series with the fuel cell pre-charge relay FCRP. The limiting resistor R reduces melting of the second fuel cell main relay FCRG. The fuel cell relay circuit 30 corresponds to a "relay" in the first aspect disclosed in "SUMMARY".

The battery 50 is connected to primary side wiring 70a of the battery step-up converter 70 through the battery relay circuit 60. The inverter 40 is connected to secondary side wiring 70b of the battery step-up converter 70. Specifically, the secondary side wiring 70b is connected to wiring that links the fuel cell relay circuit 30 and the inverter 40. Consequently, a circuit group from the battery 50 to the battery step-up converter 70 is connected in parallel to a circuit group from the fuel cell stack 10 to the fuel cell relay circuit 30. The battery step-up converter 70 corresponds to a "secondary battery step-up converter" in the first aspect disclosed in "SUMMARY".

The battery relay circuit 60 is interposed between the battery 50 and the primary side wiring 70a of the battery step-up converter 70 and switches electrical connection and disconnection between the battery 50 and the battery step-up converter 70. The battery relay circuit 60 has a first battery main relay SMRB, a second battery main relay SMRG, a battery pre-charge relay SMRP that is connected in parallel with the second battery main relay SMRG, and the limiting resistor R that is connected in series with the battery pre-charge relay SMRP. The limiting resistor R reduces melting of the second battery main relay SMRG.

The battery step-up converter 70 is a step-up converter that steps up the power of the battery 50 and supplies the stepped-up power to the inverter 40. The battery step-up converter 70 includes switching elements S1, S2, diodes D1, D2, a coil (referred to as a "reactor") L1, and capacitors C1, C2. The battery step-up converter 70 may be configured as a bidirectional DC-DC converter that can step down the power supplied to the secondary side wiring 70b and supply the stepped-down power to the battery 50. The capacitors C1, C2 are disposed on the primary side wiring 70a side and the secondary side wiring 70b side.

A fuel cell voltage sensor 12 that measures a voltage output by the fuel cell stack 10 is disposed at an output terminal of the fuel cell stack 10. The fuel cell voltage sensor 12 outputs a signal indicating a measured voltage value (hereinafter, referred to as a "fuel cell voltage") Vf to the control device 80. The control device 80 corresponds to a "controller" in the first aspect disclosed in "SUMMARY".

A current sensor 22 is disposed in the fuel cell step-up converter 20. Specifically, the current sensor 22 is disposed between the reactor La and the point 20c and measures a current flowing in the reactor La. The current sensor 22 outputs a signal indicating a measured current value (hereinafter, referred to as a "current value") IL to the control device 80.

A battery voltage sensor 52 that measures a voltage output by the battery 50 is disposed at an output terminal of the battery 50. The battery voltage sensor 52 outputs a signal indicating a measured voltage value (hereinafter, referred to as a "battery voltage") Vb to the control device 80.

Various loads that receive power supplied from the battery 50 are connected to wiring 65 that links the battery relay circuit 60 and the battery step-up converter 70. The loads are classified into a high-voltage auxiliary device 90 and a low-voltage auxiliary device 95. The loads can use any amount of power consumption (has an upper limit).

The high-voltage auxiliary device 90 is a load that uses a relatively high drive voltage. The high-voltage auxiliary device 90 is supplied with power corresponding to a voltage of approximately 300 V that is increased by a step-up DC-DC converter 91 connected to the wiring 65. Specifically, the high-voltage auxiliary device 90 can be exemplified by a hydrogen pump 90a that circulates hydrogen as fuel gas to the fuel cell stack 10, a cooling pump 90b that circulates coolant inside the fuel cell stack 10, a water heater (not illustrated) that heats water in the fuel cell stack 10 so that the water does not freeze, and the like. While the examples are peripheral devices that are included in the drive system 100 and used to cause the fuel cell stack 10 to execute power generation, the high-voltage auxiliary device 90 may be a device that is not included in the drive system 100. Specifically, the high-voltage auxiliary device 90 can be exemplified by, for example, an air-conditioning device (air conditioner) 90c included in the vehicle.

The low-voltage auxiliary device 95 is a load that uses a relatively low drive voltage. The low-voltage auxiliary device 95 is supplied with power corresponding to a voltage of approximately 12 V that is decreased by a step-down DC-DC converter 96 connected to the wiring 65. The low-voltage auxiliary device 95 can be exemplified by a flow rate adjusting valve that is disposed in a channel supplying and discharging the fuel gas, the oxidizing gas, and the coolant to the fuel cell stack 10, an off-gas discharging unit, and the like.

The control device 80 is configured as a logic circuit mainly including a microcomputer. Specifically, the control device 80 includes a CPU that executes a predetermined operation or the like in accordance with a control program set in advance, a ROM that stores the control program, control data, and the like in advance in order for the CPU to execute various operation processes, a RAM in which various types of data are temporarily read and written, and the like.

The control device 80 acquires an output signal of a start switch (not illustrated) of the vehicle, an accelerator operation amount signal from an accelerator pedal position sensor (not illustrated), and the like to control the fuel cell step-up converter 20, the fuel cell relay circuit 30, the inverter 40, the battery relay circuit 60, the battery step-up converter 70, and the like. Specifically, the control device 80 controls the output power of the fuel cell stack 10 and the battery 50 by controlling the fuel cell step-up converter 20, the fuel cell relay circuit 30, the battery relay circuit 60, and the battery step-up converter 70. The control device 80 controls output torque of the synchronous motor of the air compressor MG1 and output torque of the drive motor MG2 by controlling the inverter 40.

The control device 80 detects a short-circuit fault of the reverse current protection diode DX included in the fuel cell step-up converter 20. When the control device 80 detects a short-circuit fault, the control device 80 controls the fuel cell relay circuit 30 into a disconnected state, thereby performing a process of separating the output power of the fuel cell step-up converter 20 from the inverter 40. The process (hereinafter, referred to as a "fault process") will be described in detail below.

The drive system 100 further includes a gas system (a hydrogen gas system and an air system) and a refrigerant system belonging to the fuel cell stack 10. Components included in the systems are controlled by the control device 80.

A-2. Fault Process

Figure 2:
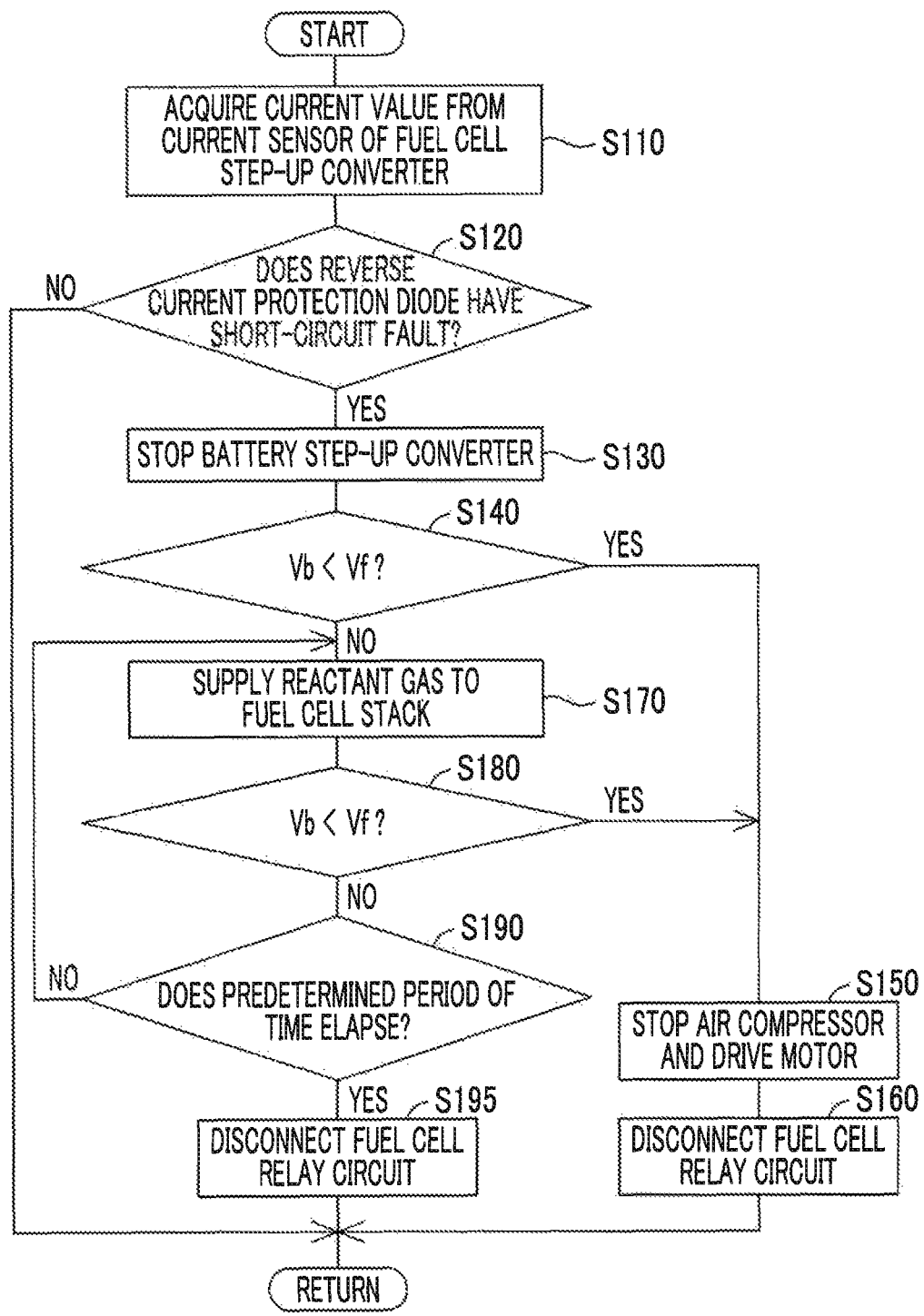
FIG. 2 is a flowchart illustrating a fault process executed by a CPU of a control device.

FIG. 2 is a flowchart illustrating the fault process executed by the CPU of the control device 80. The fault process is repeatedly executed per predetermined period of time when the drive system 100 is operated. When the process is initiated, the CPU of the control device 80 first acquires the current value IL that is received from the current sensor 22 included in the fuel cell step-up converter 20 (step S110).

Next, the CPU determines whether or not the reverse current protection diode DX included in the fuel cell step-up converter 20 has a short-circuit fault, based on the acquired current value IL (step S120). In step S120, specifically, the CPU determines whether or not the reverse current protection diode DX has a short-circuit fault by determining whether or not the acquired current value IL has a negative value. When the reverse current protection diode DX has a short-circuit fault, a current may flow into the primary side wiring 20*a* side from the secondary side wiring 20*b* side in the fuel cell step-up converter 20. The current value IL received from the current sensor 22 has a negative value when a current flows to the primary side wiring 20*a* side from the secondary side wiring 20*b* side. Accordingly, the reverse current protection diode DX is determined to have a short-circuit fault when the current value IL has a negative value.

The determination of a short-circuit fault may be performed not only based on the current value IL received from the current sensor 22 but also by other configurations. For example, the reverse current protection diode DX may be determined to have a short-circuit fault when a voltage measured on the primary side wiring 20*a* side of the fuel cell step-up converter 20 is equal to a voltage measured on the secondary side wiring 20*b* side of the fuel cell step-up converter 20.

When the CPU in step S120 determines that the reverse current protection diode DX does not have a short-circuit fault, the CPU transitions to a process of "return" and temporarily terminates the fault process.

When the CPU in step S120 determines that the reverse current protection diode DX has a short-circuit fault, the CPU stops the battery step-up converter 70 (step S130). When the reverse current protection diode DX has a short-circuit fault, the power stepped up by the battery step-up converter 70 may flow into the fuel cell step-up converter 20. Thus, first, the battery step-up converter 70 is stopped. Specifically, the battery step-up converter 70 stops stepping up and stepping down the power.

After step S130 is executed, the CPU acquires the fuel cell voltage Vf received from the fuel cell voltage sensor 12 and the battery voltage Vb received from the battery voltage sensor 52 and determines whether or not the fuel cell voltage Vf is higher than the battery voltage Vb (step S140).

When the CPU in step S140 makes a positive determination, that is, a determination that the fuel cell voltage Vf is higher than the battery voltage Vb (the battery step-up converter 70 may be stopped in step S130), a current output from the secondary side wiring 70*b* of the battery step-up converter 70 does not flow to the fuel cell step-up converter 20 side. Thus, the CPU stops an electric device that consumes power transferred to the inverter 40 from the fuel cell relay circuit 30, specifically, the air compressor MG1 and the drive motor MG2 (step S150). Then, the CPU disconnects the fuel cell relay circuit 30 (step S160). In the disconnection of the fuel cell relay circuit 30, the second fuel cell main relay FCRG and the first fuel cell main relay FCRB are disconnected in this order or reverse order. The fuel cell pre-charge relay FCRP is in a disconnected state at the time of typical operation. When step S160 is executed, the disconnected state of the fuel cell pre-charge relay FCRP is maintained. The processes of steps S150, S160 can realize "non-arc discharge" that disconnects a relay without a current. After step S160 is executed, the CPU transitions to the process of "return" and temporarily terminates the fault process.

When the CPU in step S140 makes a negative determination, that is, a determination that the battery voltage Vb is higher than or equal to the fuel cell voltage Vf, the CPU performs a process of increasing the amount of reactant gas supplied to the fuel cell stack 10 by an amount determined in advance (step S170). Specifically, the amounts of hydrogen gas and air that are supplied as the reactant gas are increased by an amount determined in advance (amount per unit time). For example, the amount of hydrogen gas is increased by an amount that can maintain the output voltage of the fuel cell at an open-circuit voltage (OCV). That is, a voltage control process that increases the voltage of the fuel cell stack 10 relative to the voltage of the battery 50 (output voltage) is performed by increasing the amount of reactant gas supplied to the fuel cell stack 10 by an amount determined in advance.

After step S170 is executed, the CPU performs the same process as step S140. That is, the CPU acquires the fuel cell voltage Vf received from the fuel cell voltage sensor 12 and the battery voltage Vb received from the battery voltage sensor 52 and determines whether or not the fuel cell voltage Vf is higher than the battery voltage Vb (step S180). The CPU transitions to the process of step S150 when the generated voltage of the fuel cell stack 10 is increased relative to the voltage of the battery 50 (output voltage) by the process of step S170 and when the fuel cell voltage Vf is determined to be higher than the battery voltage Vb by step S180. Accordingly, the air compressor MG1 and the drive motor MG2 are stopped (step S150), and then, the fuel cell relay circuit 30 is disconnected (step S160).

When the CPU in step S180 makes a negative determination, that is, a determination that the battery voltage Vb is higher than or equal to the fuel cell voltage Vf, the CPU transitions to a process of step S190 and determines whether or not a period of time determined in advance (predetermined period of time) elapses from the initiation of increasing the amount of reactant gas in step S170. When the CPU determines that the predetermined period of time does not elapse, the CPU returns to the process of step S170 and increases the amount of reactant gas. When the CPU determines that the predetermined period of time elapses, the CPU disconnects the fuel cell relay circuit 30 (step S195). The fuel cell relay circuit 30 is disconnected in a state where a current corresponding to a difference in electric potential between the battery voltage Vb and the fuel cell voltage Vf flows in the fuel cell relay circuit 30. The predetermined period of time is set in advance to have a length that is sufficient for minimizing the difference in electric potential. After step S190 is executed, the CPU transitions to the process of "return" and temporarily terminates the fault process.

A-3. Action and Effect of Embodiment

As described in detail heretofore, the drive system 100 of the first embodiment performs the fault process to detect a short-circuit fault of the reverse current protection diode DX included in the fuel cell step-up converter 20. When a short-circuit fault of the reverse current protection diode DX is detected, the drive system 100 stops the air compressor MG1 and the drive motor MG2 and disconnects the fuel cell relay circuit 30 when the fuel cell voltage Vf is higher than the battery voltage Vb. When the battery voltage Vb is higher than or equal to the fuel cell voltage Vf, the drive system 100 increases the generated voltage of the fuel cell stack 10 relative to the voltage of the battery 50 (output voltage) by supplying hydrogen gas and air. Then, the drive system 100 disconnects the fuel cell relay circuit 30. Thus, when the reverse current protection diode DX has a short-circuit fault, the drive system 100 can sufficiently reduce a reverse flow of a current to the fuel cell stack 10 from the battery step-up converter 70 side through the fuel cell step-up converter 20. Accordingly, the drive system 100 of the first embodiment can prevent melting of a contact of a relay (the first fuel cell main relay FCRB and the second fuel cell main relay FCRG) when the fuel cell relay circuit 30 is disconnected due to a short-circuit fault of a reverse current protection diode.

The drive system 100 can use the fuel cell relay circuit 30 having a small size since the fuel cell relay circuit 30 is disposed on the secondary side wiring 20b side of the fuel cell step-up converter 20. The fuel cell relay circuit 30 handles a stepped-up relatively high voltage and thus, handles a relatively low current. Thus, the fuel cell relay circuit 30 can have a small size. While a contact of a relay is likely to be melted by a relatively low current in the fuel cell relay circuit 30 having a small size, the drive system 100 of the first embodiment can securely prevent melting of the fuel cell relay circuit 30 by the fault process described above.

The fault process of the drive system 100 performs a second comparison process between the fuel cell voltage Vf and the battery voltage Vb (the process of step S180). When the fuel cell voltage Vf is determined to be higher than the battery voltage Vb, the fault process stops the air compressor MG1 and the drive motor MG2 and disconnects the fuel cell relay circuit 30. Thus, non-arc discharge can be realized with a higher probability than usual, and melting of the fuel cell relay circuit 30 can be more securely prevented. When the fuel cell voltage Vf is not increased above the battery voltage Vb even after elapsing of the predetermined period of time in the second comparison process between the fuel cell voltage Vf and the battery voltage Vb, the fuel cell relay circuit 30 is disconnected without stopping the air compressor MG1 and the drive motor MG2. As described previously, since the difference in electric potential between the battery voltage Vb and the fuel cell voltage Vf is minimized, melting of the fuel cell relay circuit 30 can be prevented without stopping the air compressor MG1 and the drive motor MG2.

B. Second Embodiment

A drive system in a second embodiment has the same configuration as the drive system 100 in the first embodiment except for having a different fault process executed by the CPU of the control device 80. In the following description, the same constituent elements will be designated by the same reference signs as in FIG. 1.

Figure 3:
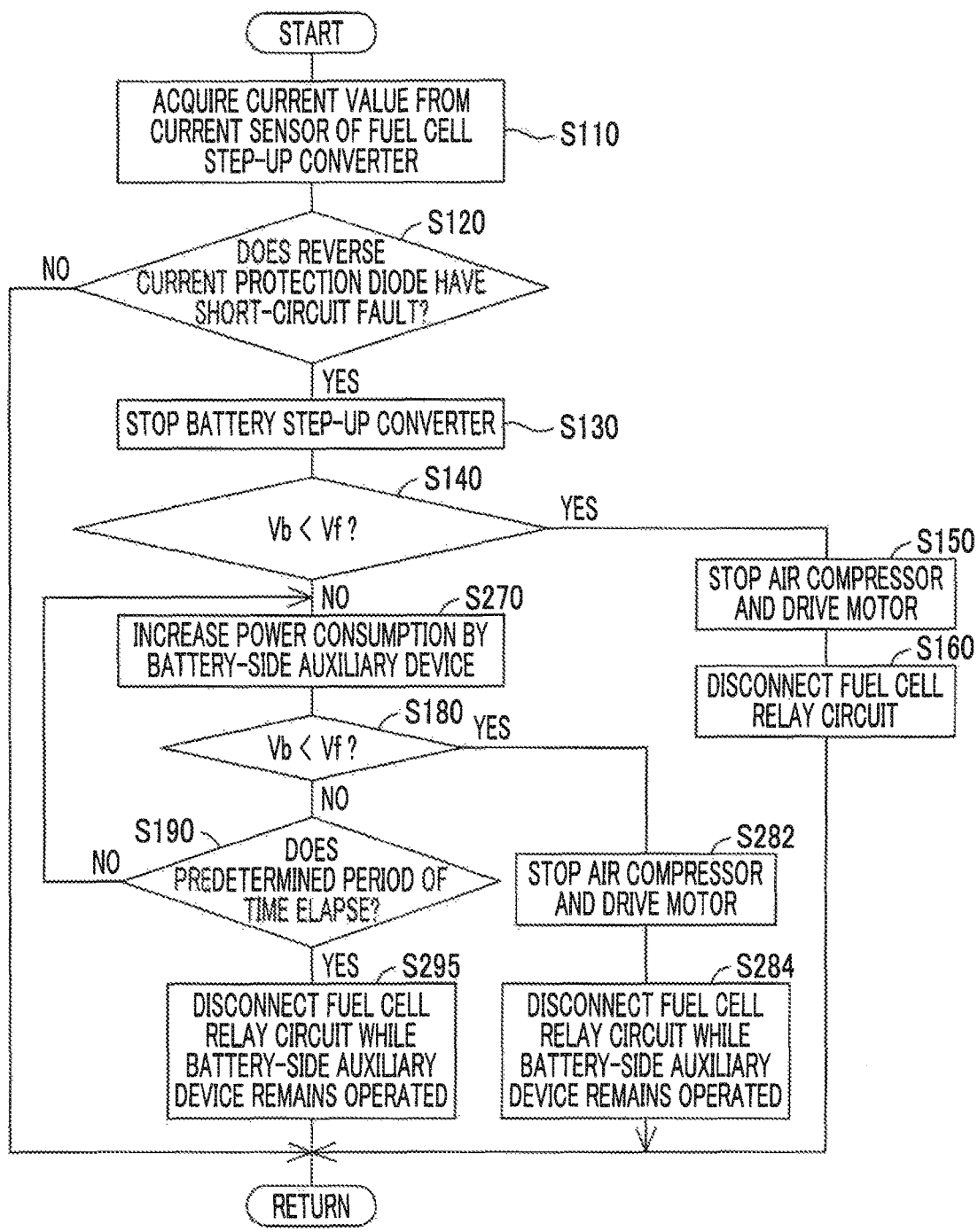
FIG. 3 is a flowchart illustrating a fault process in a second embodiment.

FIG. 3 is a flowchart illustrating the fault process in the second embodiment. The flowchart has different steps from the flowchart in FIG. 2 ill the first embodiment except for the processes of steps S110 to S160, S180, S190. The same processes of steps S110 to S160, S180, S190 will not be described.

As illustrated in FIG. 3, when the CPU makes a negative determination, that is, a determination that the battery voltage Vb is higher than or equal to the fuel cell voltage Vf, in step S140 which is a first comparison process between the fuel cell voltage Vf and the battery voltage Vb, the CPU performs a process of increasing power consumption by a battery-side auxiliary device (step S270). The battery-side auxiliary device corresponds to the high-voltage auxiliary device 90 and the low-voltage auxiliary device 95 that receive power supplied from the battery 50. Increasing power consumption by the battery-side auxiliary device can decrease the electric potential of the battery by internal resistance of the battery 50. That is, a voltage control process that increases the voltage of the fuel cell stack 10 relative to the voltage of the battery 50 (output voltage) is performed by increasing power consumption by the battery-side auxiliary device.

After step S270 is executed, the CPU transitions to the process of step S180 and performs a second comparison process between the fuel cell voltage Vf and the battery voltage Vb. When the battery voltage Vb is decreased by the process of step S270 and when the fuel cell voltage Vf is determined to be higher than the battery voltage Vb by step S180, the CPU stops the air compressor MG1 and the drive motor MG2 in the same manner as the process of step S150 (step S282). Then, the CPU disconnects the fuel cell relay circuit 30 (step S284). The battery-side auxiliary device remains in operation when the disconnection is performed. That is, in step S284, the fuel cell relay circuit 30 is disconnected while the battery-side auxiliary device remains in operation. After the process of step S284 is executed, the CPU transitions to the process of "return" and temporarily terminates the fault process.

When the fuel cell voltage Vf is not determined to be higher than the battery voltage Vb in step S180 and when, in step S190, a period of time determined in advance (predetermined period of time) is not determined to elapse from the initiation of increasing power consumption by the battery-side auxiliary device in step S170, the CPU returns to the process of step S270 and increases power consumption by the battery-side auxiliary device.

When the predetermined period of time is determined to elapse in step S190, the CPU performs the same process as step S284. That is, the CPU disconnects the fuel cell relay circuit 30 while the battery-side auxiliary device remains in operation (step S295). The fuel cell relay circuit 30 is disconnected in a state where a current corresponding to a difference in electric potential between the battery voltage Vb and the fuel cell voltage Vf flows in the fuel cell relay circuit 30. The predetermined period of time is set in advance to have a length that is sufficient for minimizing the difference in electric potential. Since the air compressor MG1 and the drive motor MG2 are not stopped, the fuel cell relay circuit 30 is disconnected while all loads of the drive system 100 remain in operation. After the process of step S290 is executed, the CPU transitions to the process of "return" and temporarily terminates the fault process.

When a positive determination is made in the first comparison process between the fuel cell voltage Vf and the battery voltage Vb and when the fuel cell relay circuit 30 is disconnected in step S160, the battery-side auxiliary device may remain in operation or may be stopped.

The drive system of the second embodiment configured as above performs the fault process to detect a short-circuit fault of the reverse current protection diode DX included in the fuel cell step-up converter 20. When a short-circuit fault of the reverse current protection diode DX is detected, the drive system stops the air compressor MG1 and the drive motor MG2 and disconnects the fuel cell relay circuit 30 when the fuel cell voltage Vf is higher than the battery voltage Vb. When the battery voltage Vb is higher than or equal to the fuel cell voltage Vf, the drive system increases the generated voltage of the fuel cell stack 10 relative to the voltage of the battery 50 (output voltage) by increasing power consumption by the battery-side auxiliary device. Then, the drive system disconnects the fuel,cell relay circuit 30. Thus, when the reverse current protection diode DX has a short-circuit fault, the drive system can sufficiently reduce a reverse flow of a current to the fuel cell stack 10 from the battery step-up converter 70 side through the fuel cell step-up converter 20. Accordingly, the drive system of the second embodiment can prevent melting of a contact of a relay when the fuel cell relay circuit 30 is disconnected due to a short-circuit fault of a reverse current protection diode.

The drive system 100 performs a second comparison process between the fuel cell voltage Vf and the battery voltage Vb. When the fuel cell voltage Vf is determined to be higher than the battery voltage Vb, the drive system stops the air compressor MG1 and the drive motor MG2 and disconnects the fuel cell relay circuit 30 while the battery-side auxiliary device remains in operation. Thus, non-arc discharge can be realized with a higher probability than usual, and melting of a relay can be more securely prevented. When the fuel cell voltage Vf is not increased above the battery voltage Vb even after elapsing of the predetermined period of time in the second comparison process between the fuel cell voltage Vf and the battery voltage Vb, the fuel cell relay circuit 30 is disconnected while all loads remain in operation. Since the difference in electric potential between the battery voltage Vb and the fuel cell voltage Vf is minimized, melting of the fuel cell relay circuit 30 can be prevented without stopping the loads.

C. Modification Examples

Modification Example 1

While the drive motor MG2 and the air compressor MG1 correspond to the electric power generator in each embodiment and each modification example, the electric power generator may be any one of the drive motor MG2 and the air compressor MG1.

Modification Example 2

The control device 80 in the first embodiment is configured to control both the constituent elements of the electrical system (FIG. 1) of the drive system 100 and the elements of the gas system and the refrigerant system of the drive system 100. As a modification example, the control device 80 (first control device) that controls the elements of the electrical system (FIG. 1) and a second control device that controls the elements of the gas system and the refrigerant system may be individually prepared, and the fault process may be executed by communication between the first control device and the second control device. In addition, the control device may be configured by using two or more, for example, two, three, or four, controllers depending on various separate purposes in addition to the electrical system, the gas system, and the refrigerant system, such that a plurality of controllers is separately used for the elements of the electrical system (FIG. 1) including the fuel cell step-up converter 20, the inverter 40, the battery step-up converter 70, and the like. Furthermore, another controller that is provided instead of the control device 80 may have the function of the control device 80 as a part of the function thereof.

Modification Example 3

The first embodiment supplies hydrogen gas and air to the fuel cell stack 10 as a voltage control process that increases the voltage of a fuel cell relative to the voltage of a secondary battery, thereby increasing the generated voltage of the fuel cell stack 10 relative to the voltage of the battery 50 (output voltage). The second embodiment increases power consumption by the battery-side auxiliary device as the voltage control process. As a modification example, both of supplying hydrogen gas and air and increasing power consumption by the battery-side auxiliary device may be executed.

The present disclosure is not limited to the embodiments and the modification examples. The present disclosure can be realized by various configurations to the extent not departing from the gist thereof. For example, technical features of the embodiments and the modification examples that correspond to technical features in each form disclosed in "SUMMARY" can be appropriately substituted or combined with each other in order to resolve a part or all of the problems described above, or in order to achieve a part or all of the effects described above. Constituent elements in the embodiments and each modification example except those disclosed in the independent claims are additional elements and can be appropriately omitted.

What is claimed is:

1. A drive system comprising:
a drive device including an electric power generator;
a fuel cell;
a secondary battery;
a fuel cell step-up converter connected between the fuel cell and the drive device, the fuel cell step-up converter including a diode configured to prevent a flow of a current to the fuel cell;
a relay connected to a wiring between the fuel cell step-up converter and the drive device;
a secondary battery step-up converter connected between the secondary battery and a part of the wiring between the drive device and the relay;
a fuel cell voltage sensor configured to measure a voltage of the fuel cell;
a secondary battery voltage sensor configured to measure a voltage of the secondary battery; and
a controller configured to, when a short-circuit fault of the diode is detected, stop the secondary battery step-up converter, disconnect the relay when the voltage of the fuel cell measured by the fuel cell voltage sensor is higher than the voltage of the secondary battery measured by the secondary battery voltage sensor after stopping the secondary battery step-up converter, and when the voltage of the secondary battery measured by the secondary battery voltage sensor is higher than or equal to the voltage of the fuel cell measured by the fuel cell voltage sensor after stopping the secondary battery step-up converter, execute a voltage control process which increases the voltage of the fuel cell relative to the voltage of the secondary battery and disconnect the relay.

2. The drive system according to claim 1, wherein the voltage control process is a control process that increases the voltage of the fuel cell relative to the voltage of the secondary battery by increasing an amount of reactant gas supplied to the fuel cell.

3. The drive system according to claim 2, wherein the controller stops the electric power generator before disconnecting the relay when the voltage of the fuel cell measured by the fuel cell voltage sensor is higher than the voltage of the secondary battery measured by the secondary battery voltage sensor.

4. The drive system according to claim 2, wherein the controller stops the electric power generator and disconnects the relay when the voltage of the fuel cell measured by the fuel cell voltage sensor is higher than the voltage of the secondary battery measured by the secondary battery voltage sensor after executing the voltage control process, and when a state in which the voltage of the secondary battery measured by the secondary battery voltage sensor is higher than or equal to the voltage of the fuel cell measured by the fuel cell voltage sensor continues for a period of time determined in advance after executing the voltage control process, disconnects the relay without stopping the electric power generator.

5. The drive system according to claim 1, further comprising an electric device configured to receive power supplied from the secondary battery,
wherein the voltage control process is a control process that increases power consumption by the electric device.

6. The drive system according to claim 5, wherein the controller stops the electric power generator before disconnecting the relay when the voltage of the fuel cell measured by the fuel cell voltage sensor is higher than the voltage of the secondary battery measured by the secondary battery voltage sensor.

7. The drive system according to claim 5, wherein when the voltage of the fuel cell measured by the fuel cell voltage sensor is higher than the voltage of the secondary battery measured by the secondary battery voltage sensor after executing the voltage control process, the controller stops the electric power generator and disconnects the relay while the electric device remains in operation.

8. The drive system according to claim 5, wherein when a state in which the voltage of the secondary battery measured by the secondary battery voltage sensor is higher than or equal to the voltage of the fuel cell measured by the fuel cell voltage sensor continues for a period of time determined in advance after executing the voltage control process, the controller disconnects the relay without stopping the electric power generator while the electric device remains in operation.

9. A vehicle comprising the drive system according to claim 1.

* * * * *